United States Patent
Sato

[11] Patent Number: 5,492,036
[45] Date of Patent: Feb. 20, 1996

[54] END CAP TYPE BALL SCREW

[75] Inventor: Hideyuki Sato, Gunma, Japan

[73] Assignee: NSK Ltd., Tokyo, Japan

[21] Appl. No.: 155,703

[22] Filed: Nov. 23, 1993

[30] Foreign Application Priority Data

Nov. 30, 1992 [JP] Japan .................... 4-320885

[51] Int. Cl.⁶ ..................... F16H 25/22
[52] U.S. Cl. ..................... 74/459; 74/424.8 R
[58] Field of Search ............... 74/459, 424.8 R

[56] References Cited

U.S. PATENT DOCUMENTS

| | | | |
|---|---|---|---|
| 3,244,022 | 4/1966 | Wysong, Jr. | 74/459 |
| 3,643,521 | 2/1972 | Nilsson | 74/459 |
| 4,557,156 | 12/1985 | Teramachi | 74/459 X |
| 4,604,911 | 8/1986 | Teramachi | 74/424.8 R X |
| 4,677,869 | 7/1987 | Mayfield | 74/424.8 R |
| 4,795,172 | 1/1989 | Brande | 277/165 X |
| 4,939,946 | 7/1990 | Teramachi | 74/89.15 X |
| 5,154,091 | 10/1992 | Bianco | 74/459 |
| 5,193,409 | 3/1993 | Babinski | 74/89.15 |

FOREIGN PATENT DOCUMENTS

| | | |
|---|---|---|
| 0319688 | 6/1989 | European Pat. Off. |
| 2908438 | 4/1987 | Germany. |
| 3924917 | 4/1990 | Germany. |
| 1050926 | 11/1966 | United Kingdom ........... 74/424.8 R |

Primary Examiner—Rodney H. Bonck
Assistant Examiner—Troy Grabow
Attorney, Agent, or Firm—Sughrue, Mion, Zinn, Macpeak & Seas

[57] ABSTRACT

It is an object of the invention to provide a ball screw of an end cap type which provides low noise, is hard to break and is inexpensive by combining a soft material easy to form and a reinforcing member having high rigidity and density to thereby form a ball circulation member. A ball circulation member formed of a soft material such as synthetic resin permitting formation of a complicated shape is covered from the outside thereof with a reinforcing member formed of metal or the like having higher rigidity and density than the soft material of the ball circulation member. Use of the reinforcing member can restrict the vibration of an elastic deformation mode involved with the circulation of balls and at the same time a sound insulation operation due to the increased mass effect of the end cap is increased to thereby be able to reduce noises. Also, the strength of the whole of the ball circulation member is increased and thus the ball circulation member is made hard to break. Further, the ball circulation member and reinforcing member can also be formed integrally and thus they can be mass produced at low costs.

12 Claims, 3 Drawing Sheets

END CAP TYPE BALL SCREW

BACKGROUND OF THE INVENTION

The present invention relates to a ball screw and, in particular, to an improved ball screw of an end cap type which includes a ball circulation passage in the end portion of a ball screw nut.

A conventional ball screw device of an end cap type, for example, is shown in FIG. 5. In the conventional ball screw device, a screw shaft 1 including a spiral groove 1a on the outer peripheral surface thereof is threadedly engaged with a cylindrical ball screw nut 2 including in the inner peripheral surface thereof a spiral groove 2a corresponding to the spiral groove 1a of the screw shaft 1 through balls 3 which can be rolled within the two mutually opposing spiral grooves 1a, 2a. The ball nut 2 comprises a nut main body 4 and two disk-shaped ball circulation members (end caps) 5 removably connected to the two end faces of the nut main body 4. The nut main body 4 includes in the thicker portion thereof a ball return passage 6 which consists of a through hole extending the axial direction thereof. The ball circulation member 5 includes, in the end face to be connected with the nut main body 4, a curved passage 7 which connects the two mutually opposing spiral grooves 1a, 2a with the ball return passage 6.

When the screw shaft 1 and ball screw nut 2 are rotated relatively to each other, then the balls 3 of steel roll and advance within the two mutually opposing ball screw grooves 1a, 2a of the screw shaft 1 and screw nut 2, and pass through the curved passage 7 formed in the ball circulation member 5 of the nut main body 4 end face and through the ball return passage 6 formed in the nut main body 4 to return to their original position, where the circulation movements will be repeated.

The curved passage 7, which is formed in the ball circulation member 5 of the conventional ball screw of an end cap type, has a complicated and delicate shape in three dimensions. If the curved passage 7 is formed by machine working, then it is inevitable that the working costs thereof will be expensive. Therefore, in the conventional ball screw of an end cap type, it is generally known to use a ball circulation member 5 of synthetic resin by use of injection forming which is able to mass produce parts each having a complicated shape at low costs.

However, the ball circulation member 5 of synthetic resin is relatively low in rigidity. For this reason, when the balls 3 circulate, the balls 3 collide with the inner surface of the curved passage 7 repeatedly to thereby cause the ball circulation member 5 to vibrate in an elastic deformation mode, which produces an unfavorably large noise in uses such as a business machine, a measuring instrument and the like requiring a low noise.

Also, when the ball screw nut 2 is moved back and forth unrotationally by rotationally driving the shaft 1, if the ball screw nut 2 overruns and collides with other parts or the like, then the ball circulation members 5 on the end face of the nut 2 can be easily broken. To solve this, it can be expected that the ball circulation members 5 are formed of a material having a relatively higher rigidity such as a metal material and the like. However, in this case, it is expensive to form the complicated curved passage, which results in an expensive ball screw of an end cap type.

SUMMARY OF THE INVENTION

In view of the above circumstances, the present invention aims at eliminating the above-mentioned drawbacks found in the conventional ball screw of an end cap type. Accordingly, it is an object of the invention to provide an improved ball screw of an end cap type which combines a ball circulation member with a reinforcing member formed of a material which is easy to form and has high rigidity and density to thereby provide a ball screw which is inexpensive, is of a low noise, and is difficult to break even if a nut overruns.

In attaining the above object, according to the invention, there is provided a ball screw of an end cap type which comprises a screw shaft including a spiral groove on the outer peripheral surface thereof, a nut main body including on the inner peripheral surface thereof a spiral groove opposing to the spiral groove of the screw shaft and in the thicker portion thereof a ball return passage consisting of a through hole extending in the axial direction thereof, ball circulation members respectively including curved passages for connecting the two mutually opposing spiral grooves with the ball return passage and connected to the two end faces of the nut main body, and a large number of balls which can be rolled circulatingly through the two mutually opposing spiral grooves, ball return passage and curved passages, in which the outside portion of the ball circulation member is covered with a reinforcing member which is formed of a material having higher rigidity and density than the material of the ball circulation member.

Due to the fact that the outside portion, which is formed of a material allowing a curved passage of a complicated shape to be formed easily, of the ball circulation member is covered with and restricted by the reinforcing member having higher rigidity and density than the material of the ball circulation member, the vibration of an elastic deformation mode involved in the ball circulation can be restricted and also the generation itself of the vibration can be restricted by mass effects, with the result that noises can be reduced.

Also, the strength of the whole circulation member is increased and, therefore, even if the nut overruns and collides with other parts, the ball circulation member will never be broken.

BRIEF DESCRIPTION OF THE DRAWINGS

FIG. 3(a) shows a case in which no reinforcing member is provided and FIG. 3(b) a case in which a reinforcing member is used;

DETAILED DESCRIPTION OF THE PREFERRED EMBODIMENTS

Description will be given hereinbelow of the embodiments of a screw ball of an end cap type with reference to the accompanying drawings.

Figure 1:
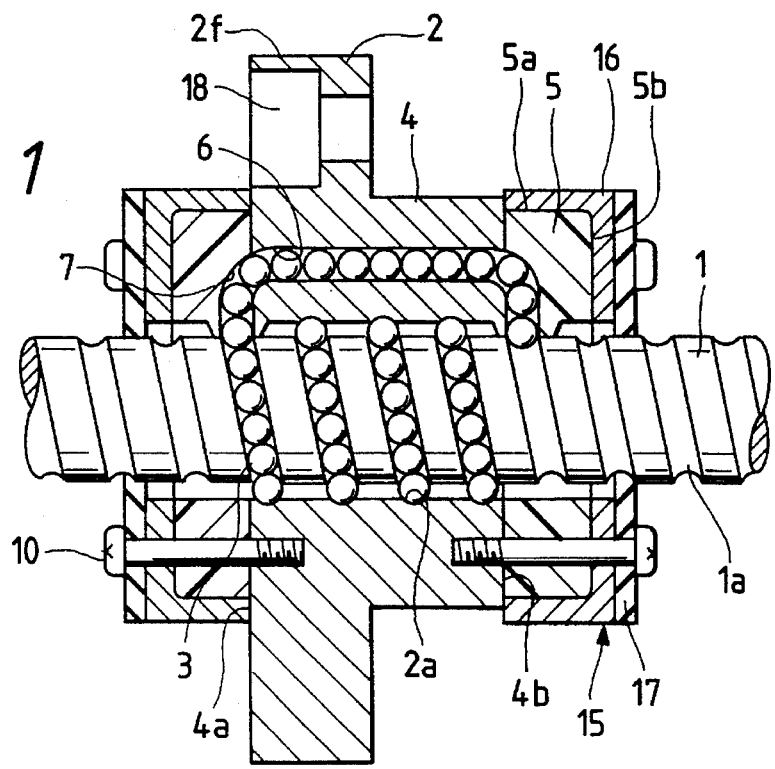
FIG. 1 is a longitudinal section view of an embodiment of a ball screw of an end cap type according to the invention.

FIG. 1 is a section view of an embodiment of a ball screw of an end cap type according to the invention. In FIG. 1, parts identical with or equivalent to those employed in the above-mentioned conventional ball screw are given the same designations and the duplicate description thereof is omitted here.

As shown in FIG. 1, there is provided a cylindrical nut main body 4 which is formed of metal and includes a mount flange 2f in one end portion thereof. End caps 15 are respectively mounted to one end face 4a of the nut main body 4 and to the opposite end face 4b thereof through screw 10. In the present embodiment, each of the end caps 15 is composed of a cylindrical ball circulation member 5 formed of synthetic resin by injection forming and a reinforcing cap 16 formed of metal such as stainless steel or the like for covering the cylindrical surface 5a of the ball circulation member 5 and an annular surface 5b on an end thereof. The reinforcing cap 16 is inserted into the cylindrical ball circulation member 5 under pressure.

In FIG. 1, reference character 18 designates a hole for a mounting blot which is used to mount a ball screw nut 2, and a seal member 17 includes an inside diameter portion which can come into sliding contact with a spiral groove 1a formed in a screw shaft 1 to thereby prevent powder, dust and the like attached to the screw shaft 1 from entering the rolling path of the balls.

Next, description will be given below of the operation of the present embodiment.

If the screw shaft 1 is rotated forwardly (reversely), then the rotational movement of the screw shaft 1 is transmitted to the ball screw nut 2 through balls 3 respectively interposed between the spiral groove 1a of the screw shaft 1 and the spiral groove 2a of the ball screw nut 2 and, responsive to this, the ball screw nut 2 is moved forwardly (backwardly) in the axial direction thereof. With the movement of the ball screw nut 2, the balls 3 roll and move to circulate in an endless circulation passage. In this case, the change of the direction of the balls 3 is executed by a curved passage 7 provided in the ball circulation member 5 of the end cap 15. That is, when the balls 3 roll within the two mutually opposing spiral grooves 1a, 2a with the movement of the ball screw nut 2 and arrive at the end cap 15 disposed in one end of the nut main body 4, then the balls 3 are guided to the curved surface of the curved passage 7 of the ball circulation member 5, are changed in direction there, and enter a ball return passage 6 formed in the nut main body 4. After then, when the balls 3 roll within the ball return passage 6 and arrive at the end cap 15 in the opposite end portion, then they are guided to the curved passage 7, are changed in direction there, and are then returned into the spiral grooves 1a, 2a of the screw shaft 1 and ball screw nut 2.

In the present embodiment, the ball circulation member 5 is an injection molding of synthetic resin and thus even a curved passage having a complicated shape can also be mass produced easily. Also, the outside portion of the ball circulation member 5 is covered with the reinforcing member 16 formed of metal and having a high rigidity, so that the whole of the end cap 15 enjoys an increased strength. Therefore, when the ball screw nut 2 is moved linearly along the screw shaft 1, for example, even if the ball screw nut 2 overruns and collides with other parts, the ball circulation member 5 is hard to break and thus the ball screw nut 2 has a long life.

Also, since the metal reinforcing member 16 covering the ball circulation member 5 has a high density and thus provides a great sound insulation effect, when a large number of balls 3 circulate in the circulation passage formed within the ball screw nut 2, the balls 3 collide successively and repeatedly with the inner surface of the curved passage 7 to thereby be able to restrict the vibration of an elastic deformation mode which is produced in the ball circulation member 5. As a result of this, when compared with the conventional ball screw of an end cap type, the present ball screw of an end cap type can reduce noises.

Figure 2:
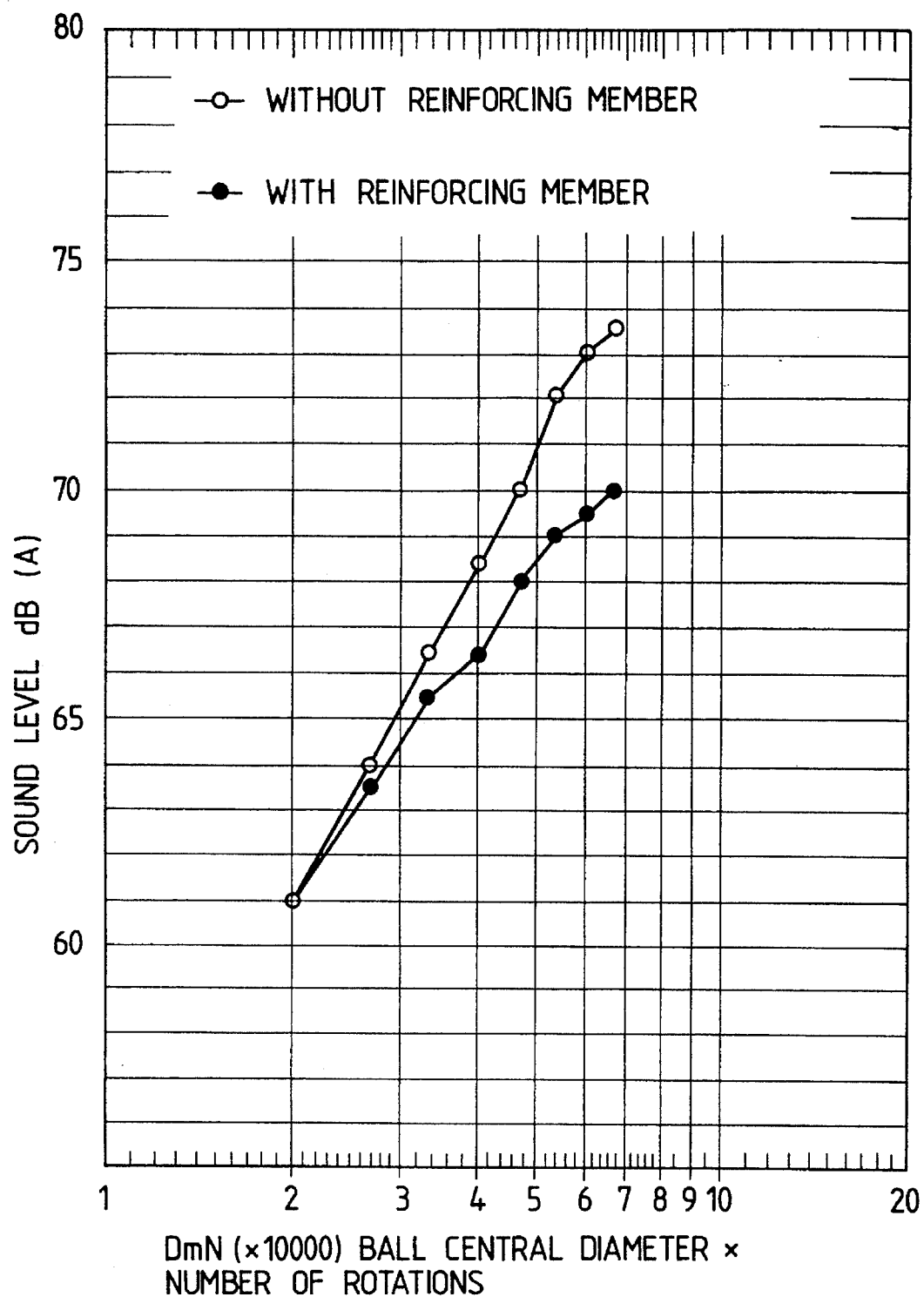
FIG. 2 is a graphical representation of a correlation between the presence or absence of a reinforcing member and noise levels in a ball screw of an end cap type.

Now, in FIG. 2, there is shown a graphical representation in which the measurement results of the noise levels in the end cap type ball screw according to the present embodiment are compared with those of the conventional end cap type ball screw. The ordinate of the graph represents the noise levels dB (A), while the abscissa thereof represents the products $D_m$ N of the central diameters $D_m$ of the balls 3 and the number of rotation N of the screw shaft. In FIG. 2, a white circle represents a case in which no reinforcing member 16 is provided but only the ball circulation member 5 is used as the end cap, whereas a black circle points out a case in which the ball circulation member 5 covered with the reinforcing member 16 is used as the end cap 15. As can be seen clearly from FIG. 2, there is found a difference of 3.5 dB (A) at the largest number of rotations between the end cap covered with the reinforcing member and the end cap with no reinforcing member.

Figure 3A:
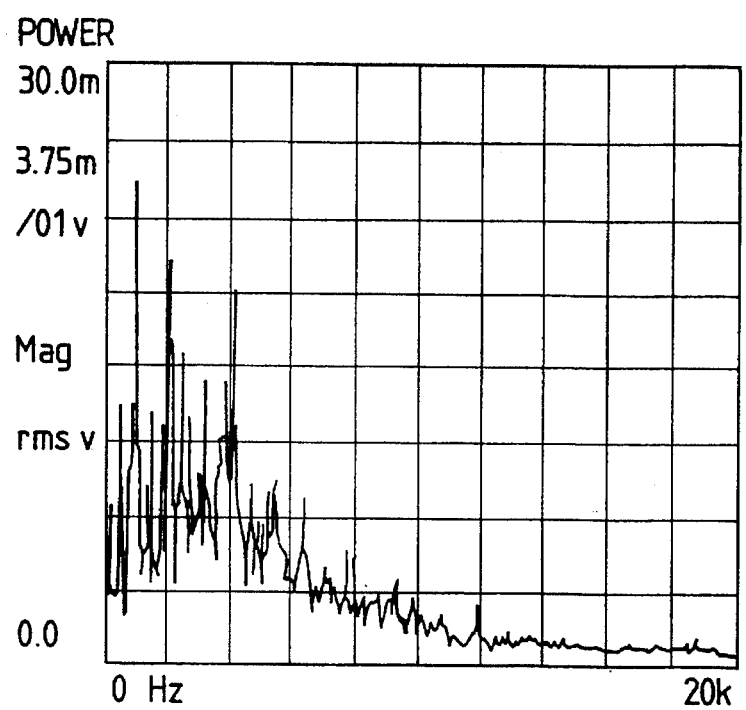
FIGS. 3(a) and 3(b) are graphical representations of the results of the frequency analysis of the noise shown in FIG. 2; in particular.
Figure 3B:
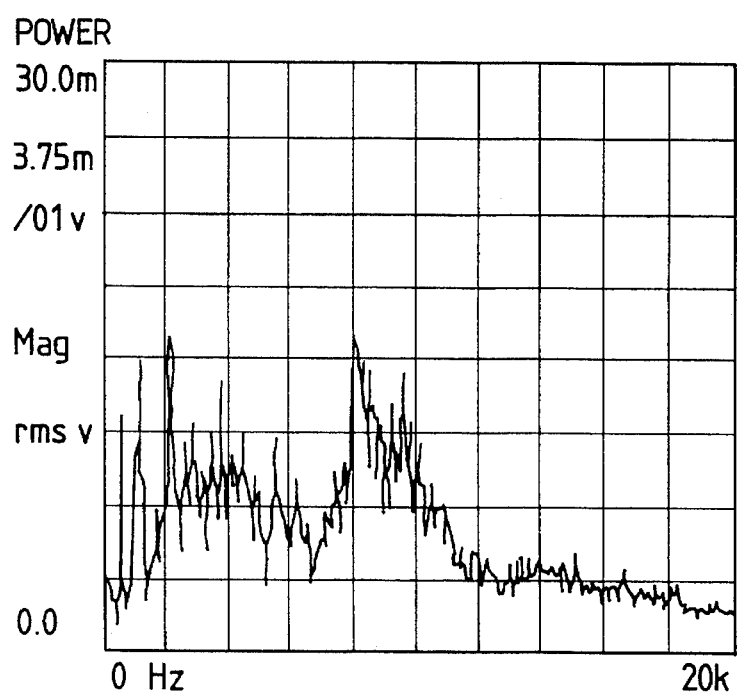

Now, FIG. 3 shows a graphical representation of the results of the frequency analysis of noises at the largest number of rotations in the above noise measurement. The ordinate of the graph represents the noise levels, while the abscissa thereof points out frequencies. In particular, in FIG. 3 (a), there is shown a case in which the end cap is composed of only the ball circulation member 5 (with no reinforcing member used); while, in FIG. 3 (b), there is shown a case in which the end cap is composed of the ball circulation member 5 reinforced by the reinforcing member 16. From the two figures, it can be found that, if the reinforcing member 16 is used, then a peak in the neighborhood of about 10 KHz is low. This is because the elastic deformation mode is restricted by the reinforcing member 16. And, it can be found from the two figures that use of the reinforcing member 16 also reduces components at or more than 10 KHz. This is due to a sound insulation effect (mass effect) provided by the increased mass of the end cap.

Figure 4:
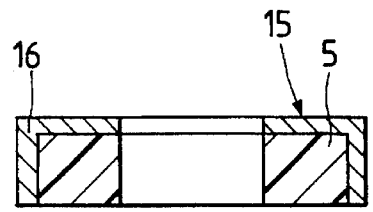
FIG. 4 is a section view of another embodiment of an end cap according to the invention; and, FIG. 5 is a longitudinal section view of a conventional ball screw of an end cap type.
Figure 5:
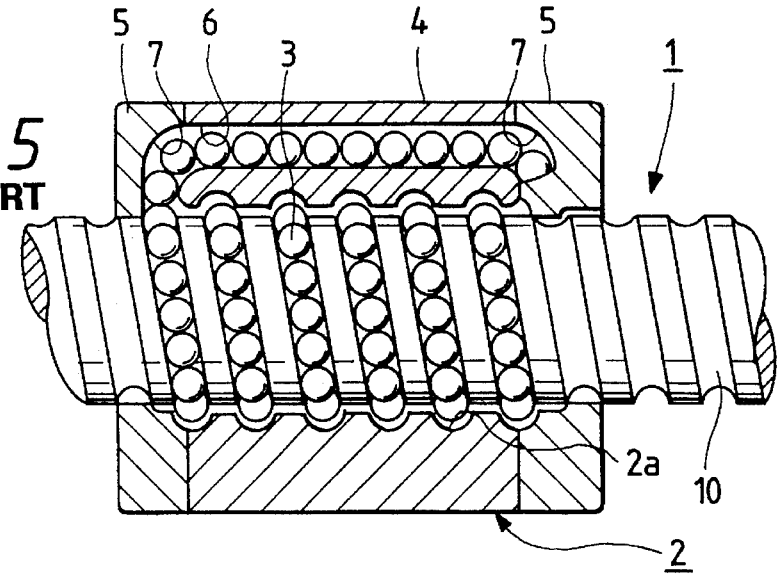

Now, in FIG. 4, there is shown another embodiment of the end cap 15.

The present end cap 15 is different from the abovementioned first embodiment in that the ball circulation member 5 formed of a soft material such as synthetic resin or the like is not pushed into but is formed integrally with the inside of the reinforcing member 16 which is machined or press formed. The operation and effects of the second embodiment are substantially similar to those of the first embodiment.

As has been described heretofore, according to the end cap type ball screw of the invention, a ball circulation member provided in the end portion of a ball screw nut is covered from the outside thereof with a reinforcing member having higher rigidity and density than the ball circulation member. This can restrict the vibration of an elastic deformation mode produced by the circulation of balls and at the same time the generation itself of the vibration is restricted by the increased mass effect of the end cap, with the result that noises can be reduced effectively.

Also, according to the invention, the strength of the whole ball circulation member is increased to thereby prevent the ball screw nut from breaking even when it overruns.

Further, it is possible to mass produce the ball circulation member and reinforcing member integrally and thus the ball screw can be supplied at low costs.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A ball screw with end caps, comprising:

a screw shaft (1) including a spiral groove (1a) on the outer peripheral surface thereof;

a nut main body (2) including on the inner peripheral surface thereof a spiral groove (2a) opposed to the spiral groove (1a) of the screw shaft (1) and including on the thicker portion thereof a ball return passage (6) consisting of a through hole extending in the axial direction thereof;

two ball circulation members (5) respectively connected to the two end faces of the nut main body (2) and each having a curved passage (7) for connecting a space formed by the two mutually opposing spiral grooves (1a, 2a) with said ball return passage (6);

a plurality of balls (3) which can be rolled and circulated in said space formed by said two mutually opposing spiral grooves (1a, 2a), said ball return passage (6) and said curved passage (7); and reinforcing means (16) for reinforcing a rigidity of said ball circulation members (5) by directly contacting an outer cylindrical surface and an outer annular end surface of an outside portion of each of said ball circulation members and covering the outside portion, said reinforcing means (16) having a higher rigidity and density than said ball circulation members (5).

2. A ball screw with end caps according to claim 1, in which each said ball circulation members (5) is made of a soft material, and said reinforcing means (16) is made of a metal.

3. A ball screw with end caps according to claim 2, in which said ball circulation member (5) is pushed into the inside of said reinforcing means (16).

4. A ball screw with end caps according to claim 2, in which said ball circulation member (5) is integrally formed with the inside of said reinforcing means (16).

5. A ball screw with end caps according to claim 2, in which each said ball circulation members (5) is made of a synthetic resin, and said reinforcing means (16) is made of stainless steel.

6. A ball screw with end caps according to claim 5, in which said ball circulation member (5) is pushed into the inside of said reinforcing means (16).

7. A ball screw with end caps according to claim 5, in which said ball circulation member (5) is integrally formed with the inside of said reinforcing means (16).

8. A ball screw with end caps according to claim 1, in which said ball circulation member (5) is pushed into the inside of said reinforcing means (16).

9. A ball screw with end caps according to claim 1, in which said ball circulation member (5) is integrally formed with the inside of said reinforcing means (16).

10. A ball screw with end caps according to claim 1, further comprising:

a seal member (17) for preventing foreign matter form entering a rolling and circulating path of said balls (3), said seal member (17) including an inside diameter portion which is brought into sliding contact with said spiral groove (1a) formed in said screw shaft (1), said reinforcing means being interposed between said seal member and one of said ball circulation members.

11. A ball screw with end caps according to claim 1, wherein said reinforcing means comprises a reinforcing cap conforming to an outer shape of the end caps.

12. A ball screw with end caps according to claim 1, wherein said reinforcing means covers a cylindrical surface and an annular surface on the outside portion of each of said ball circulation members.

* * * * *